United States Patent [19]
Whiteley

[11] 3,979,620
[45] Sept. 7, 1976

[54] SEGMENTAL DISCOIDAL WINDING STRUCTURE FOR DYNAMOELECTRIC MACHINES

[75] Inventor: Eric Whiteley, Peterborough, Canada

[73] Assignee: Canadian General Electric Co., Ltd., Toronto, Canada

[22] Filed: Mar. 11, 1975

[21] Appl. No.: 557,425

[30] Foreign Application Priority Data
July 3, 1974 Canada .............................. 203913

[52] U.S. Cl. ............................ 310/268; 310/206
[51] Int. Cl.² ...................................... H02K 1/22
[58] Field of Search ............ 310/268, 237, 203–208, 310/43, 45; 29/597, 598, 605

[56] References Cited
UNITED STATES PATENTS

| | | | |
|---|---|---|---|
| 534,953 | 2/1895 | Eickemeyer | 310/268 |
| 2,550,571 | 4/1951 | Litman | 310/268 |
| 3,069,577 | 12/1962 | Lee | 310/268 |
| 3,193,715 | 7/1965 | Moressee | 310/237 |
| 3,525,008 | 8/1970 | Burr | 310/237 |
| 3,619,899 | 11/1971 | Takeda | 310/268 |
| 3,648,360 | 3/1972 | Tucker | 310/268 |
| 3,678,314 | 7/1972 | Carter | 310/268 |
| 3,790,835 | 2/1974 | Takeda | 310/237 |
| 3,863,336 | 2/1975 | Noto | 310/268 |
| 3,869,788 | 3/1975 | Cazaroiu | 310/237 |

FOREIGN PATENTS OR APPLICATIONS 771,292 11/1967 Canada .............................. 310/268

*Primary Examiner*—R. Skudy
*Attorney, Agent, or Firm*—Vale P. Myles

[57] ABSTRACT

A discoidal winding structure for an axial gap dynamoelectric machine is made in segments. Each segment is in the general shape of a sector of the discoid and contains a fraction of the total number of winding coils, and these coils are bonded together with a resinous material into a rigid structural member. Means are provided for securing the segments together in a rigid discoidal winding structure.

6 Claims, 7 Drawing Figures

3,979,620

SEGMENTAL DISCOIDAL WINDING STRUCTURE FOR DYNAMOELECTRIC MACHINES

BACKGROUND OF THE INVENTION

This invention relates to a discoidal winding structure for dynamoelectric machines, and in particular to a structure made up of a number of separate segments of resin bonded conductors.

Canadian Patent Applications Nos. 188,535 filed Dec. 19, 1973 (corresponding to U.S. patent application Ser. No. 534,058, filed Dec. 18, 1974) and 196,860 filed Apr. 4, 1974, (corresponding to U.S. application Ser. No. 556,995 filed Mar. 10, 1975) describe discoidal winding structures in which a plurality of coils are laid overlapping in an annular array and bonded together by means of a resinous material to provide a unitary structure having an annular disc portion containing the coil sides and inner and outer ring portions containing the coil end-heads. These winding structures are made as one-piece structures, that is, all of the coils are arranged in the winding and then encapsulated in the resin. This particular means for constructing discoidal winding structures is well suited for the smaller size machines, but it is not too well suited for the larger size machines.

Therefore, the object of this invention is to provide a more suitable means for constructing discoidal winding structures for the larger machines.

SUMMARY OF THE INVENTION

A discoidal winding structure for an axial gap dynamoelectric machine has a thin annular disc portion containing the coil sides and enlarged ring portions on the inner and outer edges of the disc containing the coil end conductors, all of which portions constitute a unitary structure of winding conductors bonded together with a resinous material. The winding itself consists of a plurality of coils laid in a flat circular pattern overlapping in the lay, each coil having one or more turns. Each coil has its sides disposed radially at approximately one pole pitch, has at least one end-head joining one of the corresponding ends of the sides, and has conductors for connecting the other corresponding ends of the sides to other coils of the winding. The discoidal winding structure is characterized according to this invention in that it is composed of a number of discrete segments, preferably identical segments. Each segment contains a fractional number of the total winding coils, and these coils are bonded together by means of the resinous material into a rigid and strong structural member. In essence, each segment is in the shape of a sector of the discoidal structure. The segments are secured together in a discoidal winding structure that is strong and rigid.

DESCRIPTION OF THE DRAWINGS

A better understanding of the invention may be had from the following description taken with the accompanying drawings, in which.

DETAILED DESCRIPTION

Figure 1:
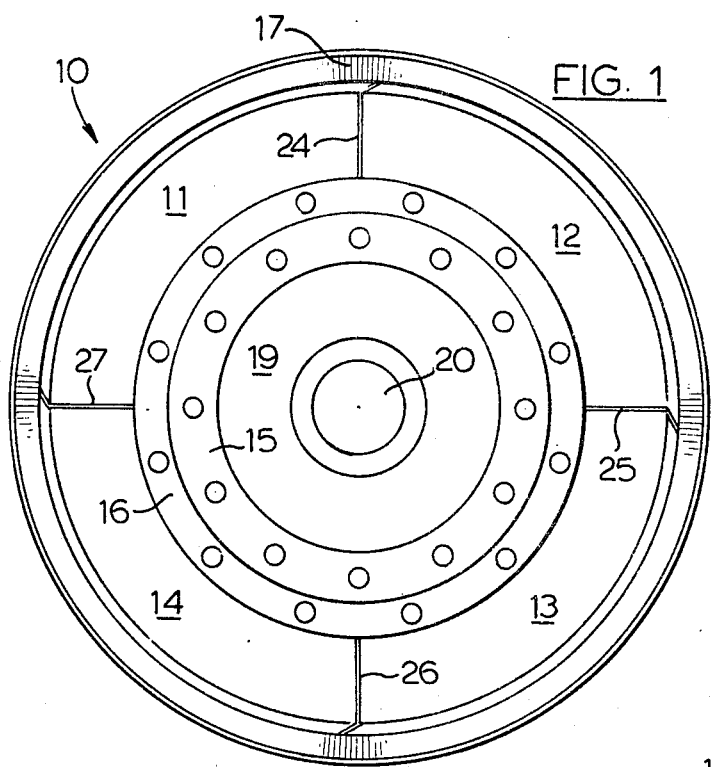
FIG. 1 is a view of one surface of a discoidal winding structure of segmental construction.
Figure 2:
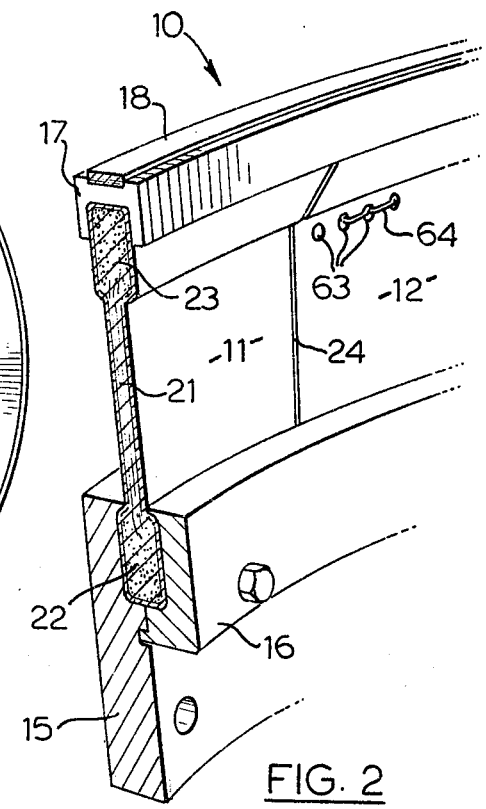
FIG. 2 is an enlarged perspective view of a portion of the discoidal winding structure.

Referring now to FIGS. 1 and 2, there is shown a discoidal winding structure for an axial gap dynamoelectric machine. It consists essentially of a pancake-like winding bonded together by means of a resinous material to provide a rigid and strong discoidal structure. The structure 10 shown in FIG. 1 consists of four discrete winding segments 11 to 14 and structural members 15 and 16 for supporting the winding assembly. It is shown as an armature for a DC machine, and it includes a peripheral commutator 17 and a prestressed band 18 around the commutator. Members 15 and 16 support the winding structure on a hub 19, the hub in turn is mounted on a shaft 20, and the shaft supports the armature structure for rotation in a stator structure of the character illustrated in the aforementioned Canadian Patent application No. 188,535. The winding structure itself (excluding components 15 to 18) has a disc portion 21 located between inner and outer ring portions 22 and 23 respectively, the three portions being coaxial with respect to shaft 20 and normal thereto. Disc portion 21 contains the coil sides, that is, conductors which interact with the field for motor or generator operation, and the ring portions contain the coil end-heads, or inactive conductors. When structure 10 is an operative unit of a dynamoelectric machine, its disc portion is located in the magnetic field of the stator so that the coil sides cut across the axially oriented field flux present in the stator.

In FIG. 1, structure 10 is shown divided at 24 and 27 into the four segments 11 to 14. In plan form the segments appear as sectors of the discoid. Preferably, they are alike or as nearly alike as it is possible to make them, and each contains a fractional number of the winding coils. Each segment is a rigid and strong structural member of resin bonded conductors. The segments are secured together into a rigid discoidal structure by means of members 15 and 16, which act as a clamp to secure their inner ring portions, and other means to be described later. Since each segment is a fractional unit of the whole, its structure and relationship to the other segments are important factors. The segments should be separated in such a way that each contains a complete set of coils. That is, the surfaces of separation should lie between coils; a surface should not pass through a coil and thereby divide its turns between two segments.

Figure 3:
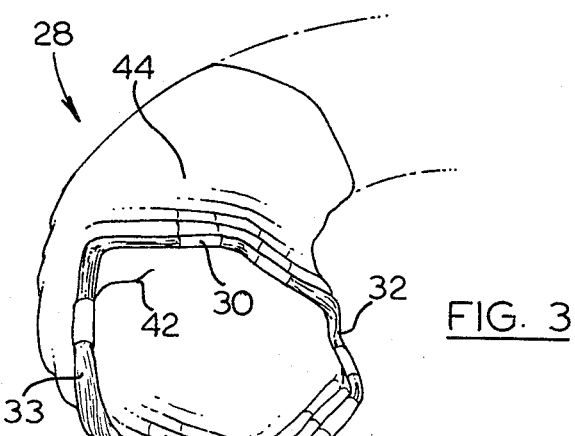
FIG. 3 is a perspective view of a group of coils for a segment of the discoidal winding structure.
Figure 4:
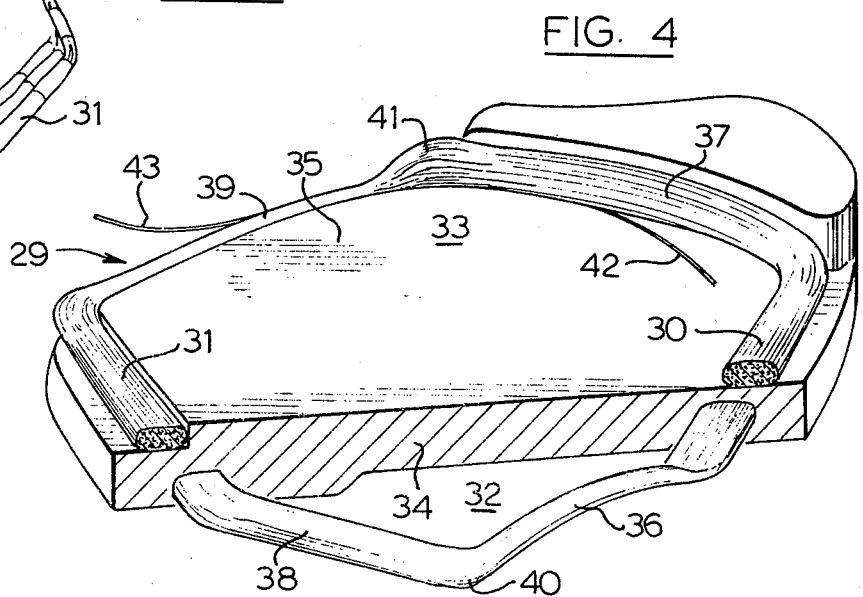
FIG. 4 is a perspective view of a coil for the discoidal winding structure.

FIG. 3 illustrates a winding segment of coils of the type shown in FIG. 4. In FIG. 3 there is shown a winding segment 28 suitable for use in a discoidal winding structure of the type shown in FIGS. 1 and 2. This segment consists essentially of a plurality of multiple turn coils 29 laid in a flat circular array with the coil sides 30 overlapping sides 31 and the inner and outer end-heads 32 and 33, respectively, nested together. The coils are identical, or as nearly identical as it is possible to make them, and their shape is such that they minimize copper and yet fit well together in a compact winding segment. The shape and lay of the coils as they appear during the winding operation is shown in FIG. 3. Once the coils are in place in the winding segment, the sides of the coils are pressed together to a specified coil side thickness and the entire winding segment is then encapsulated in a resinous material such as an epoxy resin that will flow between the conductors. The resin may be reinforced with glass fibers in selected regions to improve the encapsulated structure. The resulting product is a segmental structure of electrical conductors bonded together by means of a resinous material. This member must be rigid and strong enough to make a rotor in which it is used self-supporting under operating conditions; however, when the winding structure is attached to a stator structure, the member may be somewhat less robust. The resin bonded winding segment is in the configuration of a sector of the annular structure shown in FIG. 1. As best seen from FIG. 2, it has a disc portion 21 located between enlarged inner and outer ring portions 22 and 23 respectively. Disc portion 21 is relatively thin and contains the sides 30, 31 of coils 29, the sides being radial and at a span of approximately one pole pitch of field structure. Heads 32 on the converging ends of the sides are located in the inner ring portion 22 and heads 33 on the diverging ends of the sides are located in the outer ring portion 23.

Coil 29 will now be described in more detail with reference to FIG. 4. It is to be noted that the coil is shown in this figure on a forming block 34 having a flat surface 35 which will be referred to hereinafter as plane 35. This block is included for the purpose of showing the sides and end-heads of the coil in relation to the plane. Coil 29 has one side 30 and significant lengths 36, 37 of the end heads 32 and 33 respectively lying on one side of plane 35, the other side 31 and significant lengths 38, 39 of the end-heads lying on the other side of plane 35, a cranked portion 40 traversing plane 35 and interconnecting lengths 36 and 38, and another cranked portion 41 traversing plane 35 and interconnecting lengths 37 and 39. In a preferred form of coil 29, sides 30 and 31 will be straight and of equal radial length, lengths 36 and 38 will be equal and each about half the length of end-heads 32, lengths 37 and 39 will be equal and each about half the length of end-head 33 and the cranked portions 40 and 41 will be alike and in the middle of the respective end-heads. The outer end-head 33 will usually be curved to conform with the curvature of the outer ring portion 23 of the winding structure. The inner end-head 32 may also be curved depending on the curvature of the inner ring portion 22. It is to be noted from FIGS. 3 and 4 that the coils are laid in place with the sides 30 overlaying the sides 31, the lengths 36 and 37 overlaying the lengths 38 and 39, and the cranked portions 40 and 41 transposing the lay. Hence, the relationship of the plane 35 of FIG. 4, to the coils is maintained throughout winding segment. However, this relationship may be disturbed somewhat when the coil sides are pressed together to reduce the thickness of the winding disc portion.

In FIGS. 3 and 4 the coil ends 42 and 43 are shown coming off the outer end-head. This is a convenient place to bring them out when they are to be connected to a commutator located on the periphery of the outer ring portion. It will be appreciated that in a multiple turn coil, the ends can be brought out at either end-head, the location selected depending upon the connections to be made. However, in the case of a single turn coil, only one of the end-heads is provided and the coil ends are simply extensions of the coil sides. When a commutator is provided the coil ends will be brought out where they are accessible to the commutator. However, in the case of an AC winding, the coils will be interconnected where it is convenient to do so.

After the required number of coils 29 have been assembled into the winding segment 28 shown in FIG. 3, they are pressed to a desired segmental shape. This pressing operation may force interleaving of some coil side conductors in the mid region 44 of winding segment 28 where sides 30 and 31 overlap. However, the pressing operation should keep the exposed sides 31 below plane 35 and the exposed sides 30 above plane 35. That is, the conductor areas encompassed by the two end coils should lie on opposite sides of the plane. These areas must be such that the two areas on each segment mate with similar but oppositely disposed areas on the adjoining segments. Moreover, in the mating of the various segments, the coils therein must take the same relative positions in the overall winding. This relationship must be maintained after encapsulation of the coils in a resinous material such as an epoxy resin. A suitable fixture may be used to facilitate encapsulation. This fixture holds the coils in place and serves as a mold for the fluid resin so that once the resin is cured the segment has the shape necessary for making it fit in with other like segments in the discoidal structure. Each segment of resin bonded conductors may be reinforced with glass fibers, such as glass cloth, which aid in providing a rigid and strong structural member.

Figure 5:
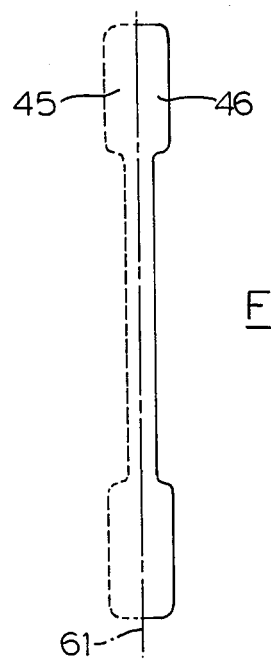
FIG. 5 is a view in cross section of the winding structure.
Figure 6:
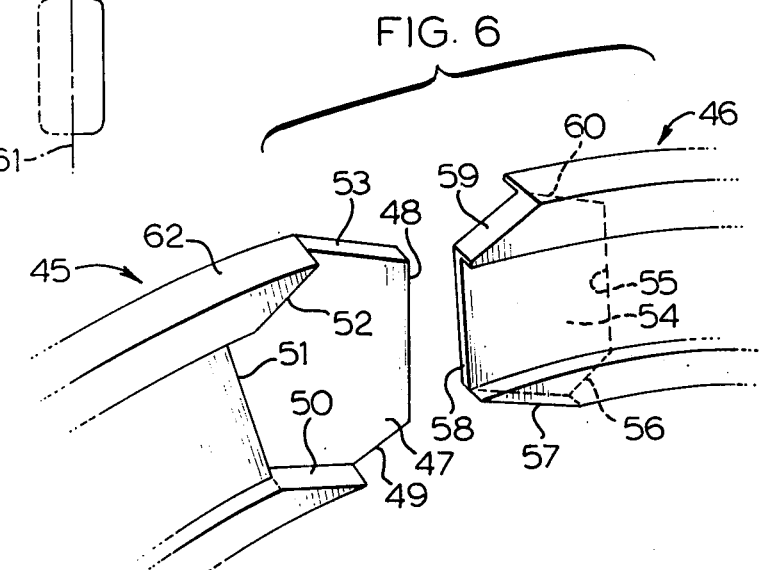
FIG. 6 is a view in perspective of adjoining segments.

Reference should now be made to FIG. 6 where the joint between two adjoining segments 45 and 46 is illustrated without details. In this joint, the surfaces on segment 45 designated 47 to 53 mate with the surfaces on segment 46 designated 54 to 60, that is, they are complementary surfaces. When segments 45 and 46 are in fully assembled relation, surfaces 47 to 53 engage surfaces 54 to 60 respectively. Surfaces 47 and 54 lie in the mid plane 61 of the discoid as shown in FIG. 5. This plane corresponds with the plane 35 of the coil 29 shown in FIG. 4. The surfaces 48 to 53 outlining surface 47 also outline the coil at the end of the segment; the end coil lies in the resin just below these surfaces. The surfaces 55 to 60 outlining surface 54 also outline the coil at the end of segment 46. When the two segments are in assembled relations, these two coils assume the same relative positions in the assembly as any of the other coils. All of the segments in the winding structure fit together in this way.

The various segments may be fastened together in a number of ways. Referring again to FIGS. 1, 2 and 6, a preferred means is to bond the segments together by means of a strong adhesive (such as an epoxy glue that adheres well to the resinous material in the segments) applied to the contacting surfaces 47 to 60. Even though the regions of overlap are large enough to produce good glued joints, some reinforcing means will usually be provided. In addition to supporting the discoidal structure, members 15 and 16 have the inner ring portions 22 of the segments 11 to 14 clamped between them. Another reinforcing means is the band 18 which also holds the segments of commutator 17 in place. In the case of FIG. 6 where no commutator is shown, the band will be applied around the peripheral surface 62. Yet another reinforcing means is shown in FIG. 2 as a series of holes 63 through the overlapping disc portions adjacent the outer ring portions and a fastening means 64 in the holes. Means 64 can take the form of a lashing of resin bonded glass filaments. A suitable lashing material is a glass fiber roving filled with a semi cured polyester resin threaded through these holes as stitches. The roving is applied in tension and the resin then cured to its final hard state to set the lashing permanently in place.

Figure 7:
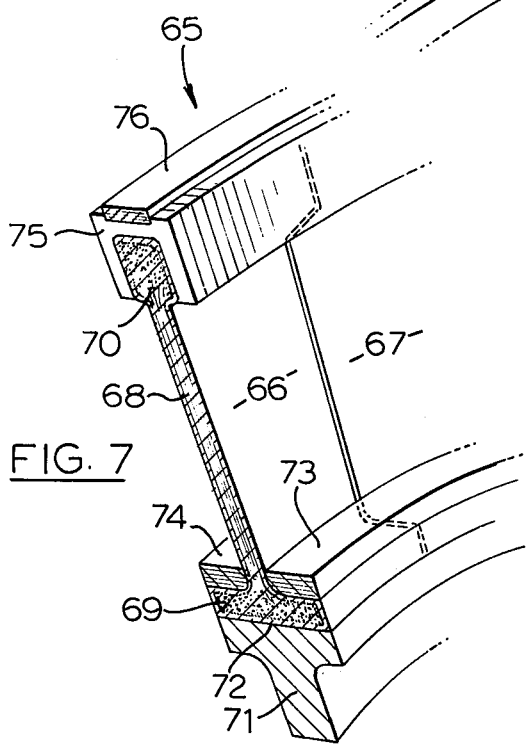
FIG. 7 is a view like FIG. 2 of another embodiment of the invention.

FIG. 7 illustrates another way of securing a segmental winding structure together on the peripheral surface 72 of a hub structure 71. In this figure, the inner ring portion 69 of the winding segments is made with flanges wide enough in an axial direction that a pair of tension bands 73 and 74 can be applied over them. These bands may be a roving of glass filaments filled with a semi cured polyester resin, the bands being applied under tension and the resin then cured to its solid state. As in the case of FIGS. 1, 2 and 6, the adjoining segments 66 and 67 may have their overlapping joints bonded together by means of an adhesive and a lashing applied to strengthen the bond. Structure 65 is shown with a peripheral commutator 75 and a prestressed resin-fiberglass band 76 around the commutator.

Segmental winding structures of the type described can be produced with or without a commutator. Moreover, the commutator need not be on the periphery of the winding structure; it may, for example, be located at the inner ring portion of the winding structure. When a commutator is provided, as many as possible of its segments will be assembled to the winding segments and bonded thereto during encapsulation, and the remaining commutator segments at the overlapping joints assembled to the completed discoidal structure. In the case of the winding structures 10 and 65 shown in FIGS. 2 and 7, the prestressed bands 18 and 76 will be applied last to tie the whole assembly together in a mechanically strong discoidal structure.

Although multiple turn coils 29 have been described with reference to FIGS. 3 and 4, the number of turns per coil is of no particular significance in the practice of the invention; single turn coils can also be used. The number of segments used in a winding is a matter of design. In theory, any number of segments equal to or less than the total number of coils in the winding is possible. In practice, however, each segment will contain a significant number of coils. The number of segments selected will depend on electrical and mechanical considerations.

Although a symmetrical construction has been described and appears to be the most advantageous, an asymmetrical construction may well be more suitable for certain applications. In an asymmetrical construction, one or both of the ring portions are offset with respect to the disc portion, the offset being in the same or opposite directions. To obtain an offset ring portion, the end-heads in that portion are offset laterally from the plane of the disc portion.

What is claimed as new and desired to be secured by Letters Patent of the United States is:

1. A discoidal winding structure for use in an axial gap dynamoelectric machine consisting essentially of a plurality discrete winding segments each having multiple complete coils overlapped in a circular array, interconnected electrically and bonded together with a bonding medium to provide a rigid segmental structure; means for securing said segments together in a unitary discoidal winding structure having an annular disc portion containing the coil sides and ring portions on the inner and outer edges of the disc portion containing the coil end-heads and coil end conductors; means for interconnecting said segments electrically; each one of said segments containing a fractional number of the winding coils and having surfaces mating with complementary surfaces on the adjoining segments, and each one of said surfaces being located at a segment end coil such that said end coils assume the same relative positions in the discoidal winding structure as the other coils.

2. The winding structure of claim 1 wherein those portions of said mating surfaces outlined by the end coils of the segments lie in a mid plane of said disc portion and the remaining portions of the mating surfaces deviation from the plane.

3. The winding structure of claim 1 wherein those portions of said mating surfaces outlined by the end coils of the segments lie mainly in said disc portion and said remaining portions of the mating surfaces lie mainly in said ring portions.

4. The winding structure of claim 1 wherein said mating surfaces are bonded together by means of an adherent and strong medium.

5. The winding structure of claim 1 wherein said means for securing said segments together comprises a strong bonding medium adhering to said mating surfaces; means for securing said inner ring portion to a hub structure; and prestressed banding means around the peripheral surface of said outer ring portion.

6. The winding structure of claim 1 wherein said means for securing said segments together comprises a strong bonding medium adhering to said mating surfaces; means for securing said inner ring portion to a hub structure; prestressed banding means around the peripheral surface of said outer ring portion; and means for lashing said segments together to reinforce the discoidal structure.

* * * * *